United States Patent

Kamiyama

[11] Patent Number: 5,534,216
[45] Date of Patent: Jul. 9, 1996

[54] METHOD FOR MANUFACTURING SYNTHETIC RESIN CONTAINERS

[75] Inventor: Tadamasa Kamiyama, Takatsuki, Japan

[73] Assignee: RP Topla Limited, Ibaraki, Japan

[21] Appl. No.: 234,878

[22] Filed: Apr. 28, 1994

[30] Foreign Application Priority Data

May 11, 1993 [JP] Japan .................................. 5-109552

[51] Int. Cl.$^6$ ............................ B29C 45/04; B29C 45/14
[52] U.S. Cl. ........................... 264/511; 264/513; 264/572
[58] Field of Search .................................. 264/511, 513, 264/572, 266

[56] References Cited

U.S. PATENT DOCUMENTS

| | | | |
|---|---|---|---|
| 4,101,617 | 7/1978 | Friederich | 264/572 |
| 4,968,474 | 11/1990 | Ito | 264/572 |
| 5,006,188 | 4/1991 | Usui et al. | 264/511 |
| 5,028,377 | 7/1991 | Hendry | 264/572 |
| 5,277,865 | 1/1994 | Hara et al. | 264/572 |
| 5,283,028 | 2/1994 | Breezer et al. | 264/511 |
| 5,310,330 | 5/1994 | Zweig et al. | 425/116 |

FOREIGN PATENT DOCUMENTS

| | | |
|---|---|---|
| 320925 | 6/1989 | European Pat. Off. . |
| 326355 | 8/1989 | European Pat. Off. . |
| 498444 | 8/1992 | European Pat. Off. . |
| 510414 | 10/1992 | European Pat. Off. . |
| 529080 | 3/1993 | European Pat. Off. . |
| 42002306 | 8/1992 | Germany . |
| 57-163544 | 10/1982 | Japan .................. 264/572 |
| 2-090330 | 4/1991 | Japan .................. 264/572 |
| 5-84764 | 4/1993 | Japan . |
| 5-84786 | 4/1993 | Japan . |
| 551526 | 7/1993 | Japan .................. 264/511 |
| 2252936 | 8/1992 | United Kingdom . |

OTHER PUBLICATIONS

Derwent Abstract of JP 6-055671 (Mar. 1, 1994).

*Primary Examiner*—Catherine Timm
*Attorney, Agent, or Firm*—Armstrong, Westerman, Hattori, McLeland & Naughton

[57] ABSTRACT

A method for manufacturing synthetic resin containers which are excellent in strength, toughness and heat insulation and have inner surfaces smooth and agreeable to the touch. The method including the steps of: (a) forming an inner surface layer component from a synthetic resin sheet by thermoforming; (b) fitting the inner surface layer component onto a male die; (c) pouring a synthetic resin in a melt condition into the inside of a female die; (d) fitting the male die onto the female die and bringing it close to the female die to compress the synthetic resin; (e) injecting compressed air into the synthetic resin through at least one air nozzle formed in the female die while enlarging a gap between the male and female dies so as to correspond to a predetermined thickness of a prospective molded product; (f) causing the compressed air to press the synthetic resin against entire inner surface of the cavity; and (g) cooling the synthetic resin to solidify the same and releasing the product from the dies.

1 Claim, 5 Drawing Sheets

METHOD FOR MANUFACTURING SYNTHETIC RESIN CONTAINERS

BACKGROUND OF THE INVENTION

The present invention relates to a method for manufacturing various types of containers made of synthetic resin (hereinafter referred to as "synthetic resin container(s)") and, more particularly, to a method capable of easily manufacturing synthetic resin containers having excellent strength and heat insulating characteristics such as a wash basin, wash or kitchen sink and bathtub.

Hitherto, the most prevailing synthetic resin containers such as bathtubs and sinks have been manufactured by an FRP manufacturing method. Specifically, a bathtub or the like is formed of a material mainly containing fiberglass reinforced polyester resin.

The following problems have recently been highlighted with regard to bathtubs of such type and the like containers.

(1) The use of glass fiber deleteriously affects the working environment. Specifically, glass fiber clings to operator's clothing or sticks into operator's skin. Further, minute glass fiber fragments are sucked into the operator's body together with air breathed in and hence cause various health hazards.

(2) It is difficult to recycle the material of a product since the material is a thermosetting resin and, furthermore, glass fiber is used therein.

While the recycling of materials of products is now being advocated all over the world as a part of the environmental protection, ships made of FRP or like products present critical problems because of their large size. Containers such as bathtubs and sinks also face these problems inevitably. Nevertheless, the conventional containers like bathtubs are not able to cope with such problems.

It is a long time since a bathtub made by thermoforming an acrylic resin plate appeared on market. Initially, the bathtub of such type was manufactured from an acrylic plate of about 8 to about 10 mm thickness. This type of bathtub deteriorated with lapse of years and was often damaged by a mere fail-down of a hand shower (a shower tool to be held by hand for use) or the like after being used for only a few years.

In view of such disadvantage, there has recently appeared a bathtub of the type made by thermoforming an acrylic resin sheet of about 5 mm thickness and then reinforcing it with a backup of FRP. It is, however, apparent with this bathtub that again there arise the aforementioned problems (1) and (2) associated with the bathtubs of FRP, a problem of high costs and a like problem.

Furthermore, any of the aforementioned methods necessarily leads to a container product having solid and rather thin wall (around 5 mm in thickness) consisting of single or double layer(s). Hence, it is hard to say that containers requiring a heat insulating function such as a bathtub exhibit heat insulation sufficient to meet the requirements of users.

In view of the foregoing problems, it is an object of the present invention to provide a method for manufacturing synthetic resin containers of a multilayered structure comprising a reinforcing layer which is excellent in both strength and toughness and has a good heat insulating function, and an inner surface layer component which is very agreeable to the touch.

SUMMARY OF THE INVENTION

According to the present invention, there is provided a method for manufacturing a synthetic resin container, comprising the steps of:

(a) forming an inner surface layer component adapted to constitute an inner surface of the container from a synthetic resin sheet by thermoforming;

(b) fitting the inner surface layer component onto a male die;

(c) pouring a synthetic resin in a melt condition into the inside of a female die;

(d) fitting the male die onto the female die and bringing the male die close to the female die to compress the synthetic resin, thereby compressively extending the synthetic resin within a cavity defined between a back surface of the inner surface layer component fitted on the male die and the female die;

(e) injecting compressed air into the synthetic resin through at least one air nozzle formed in the female die while enlarging a gap between the male and female dies so as to correspond to a predetermined thickness of a prospective molded product, thereby forming hollow portions within the synthetic resin;

(f) causing the compressed air to press the synthetic resin against entire inner surface of the cavity defined between the back surface of the inner surface layer component and the female die; and (g) cooling the synthetic resin to solidify the same and releasing a molded product from the dies.

Preferably, the method of the present invention further comprises the step of providing at least one independently movable portion to the female die and, after lapse of a predetermined time period from the aforesaid step (e), moving the independently movable portion in a direction so as to enlarge the gap between the male and female dies to form a reinforcing rib within the hollow portion.

With the method of the present invention, the inner surface layer component is previously formed from the synthetic resin sheet by thermoforming and, hence, the resulting container product offers a smooth inner surface which is agreeable to the touch. This good touch effect will be further improved if the inner surface layer component is formed from an acrylic resin sheet in particular. Therefore, in molding the hollow synthetic resin layer (hereinafter referred to as "reinforcing layer") integrally with the back of the inner surface layer component, mold finishing is not particularly necessary. That is, not so high cavity surface finishing precision is required for the dies, resulting in less costly dies.

Further, the container manufactured by the present method is highly advantageous in that it has a light weight and a high strength while enjoying a highly enhanced heat insulating effect, since the reinforcing layer has hollow structure. The method is also advantageous in that the reinforcing rib can readily be formed within the hollow portion of the reinforcing layer.

In addition, the use of a thermoplastic resin facilitates the recycling of the container resulting from the present method. Hence, the method of the present invention can be said to be an excellent method from the viewpoints of environmental protection. Furthermore, the product container is imparted with a sufficient strength without the use of glass fiber, so that no fear of adversely affecting the working environment to cause operator's troubles will occur.

Still further, the pressure of the compressed air allows the molten synthetic resin to be uniformly pressed against the entire inner surface of the cavity during the cooling and solidification of the molten resin. Hence, the outside form of the product reflects the inside form of the cavity faithfully, while in addition there is no occurrence of strain, sink, warp or depression, nor the development of thin portions due to uneven flow of the resin.

DETAILED DESCRIPTION

The present invention will now be described in detail with reference to the attached drawings.

Figure 1:
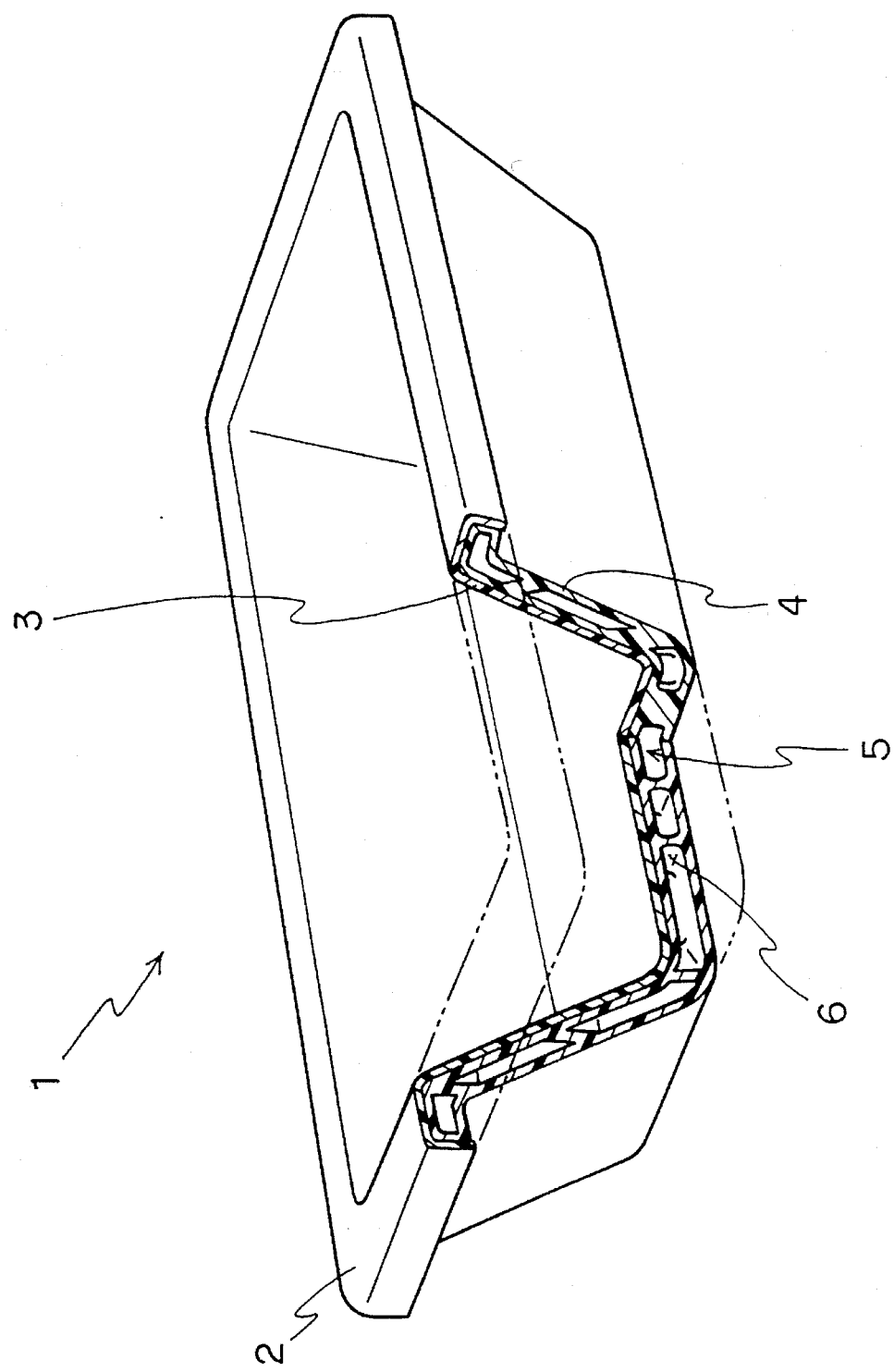
FIG. 1 is a partially cut-away perspective view of one example of a bathtub manufactured according to the method of the present invention.

Referring to FIG. 1, numeral 1 denotes a bathtub manufactured according to a method to be described later which has an opening defining edge 2 and an inner surface layer 3 each formed of polymethylmethacrylate (hereinafter referred to as "PMMA resin"). The bathtub 1 further has a hollow reinforcing layer 4 of thermoplastic resin formed on the back side of the inner surface layer 3. Within a hollow 5 defined in the reinforcing layer 4 are formed a plurality of ribs connecting the opposing walls of the hollow 5.

The PMMA resin layer constituting the inner surface of the bathtub 1 renders the inner surface smooth and agreeable to the touch. Further, since the bathtub is a hollow molded product resulting from the integral molding of the inside and outside, the bathtub 1 has a high rigidity and exhibits an excellent heat insulation. In addition, the provision of the ribs 6 within the hollow 5 imparts the bathtub 1 with a strength sufficient to withstand the use for a bathtub.

FIG. 2 schematically illustrates the process of producing the bathtub 1. As shown in FIG. 2a, firstly, a PMMA resin sheet S is formed to be used for the inner surface layer 3 (hereinafter referred to as "inner surface layer component 8") using a vacuum forming mold 7 defining the inner shape of the bathtub. The thickness of the inner surface layer component 8 is not particularly limited but is usually selected from the range of not more than 5 mm.

Figure 2A:
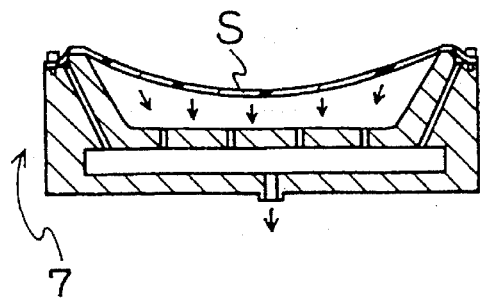
FIGS. 2a, 2b, 2c, 2d are explanatory views for illustrating an embodiment of the method of the present invention.
Figure 2B:
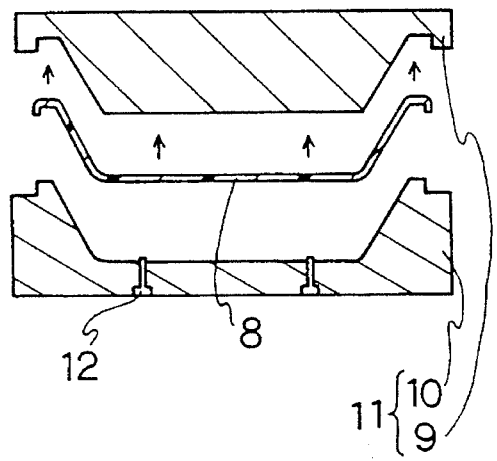

As shown in FIG. 2b, in turn, a mold 11 comprising a male die 9 and a female die 10 is prepared. The male and female dies 9 and 10 each define a cavity of substantially the same inner shape as the cavity of the vacuum forming mold 7. The female die 10 has at least one air nozzle 12 for injecting the compressed air, the air nozzle 12 being adapted to slightly project into a molten resin to be introduced into the female die 10. The inner surface layer component 8 previously formed is fitted onto the male die 9.

Figure 2C:
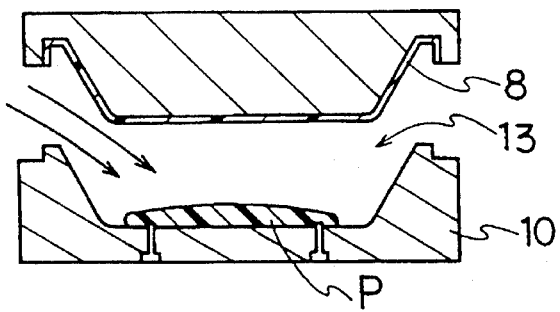

In turn, as shown in FIG. 2c, a predetermined amount of molten resin (hereinafter referred to as "resin" for simplicity) P is poured into the cavity 13 of the female die 10.

Figure 2D:
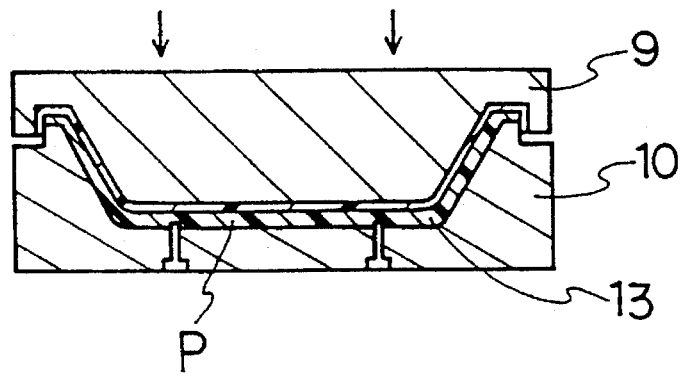

Subsequently, as shown in FIG. 2d, the male die 9 is brought close to the female die 10 to fit onto the female die 10 to compressively extend the resin P between the female die 10 and the inner surface layer component 8.

Figure 2E:
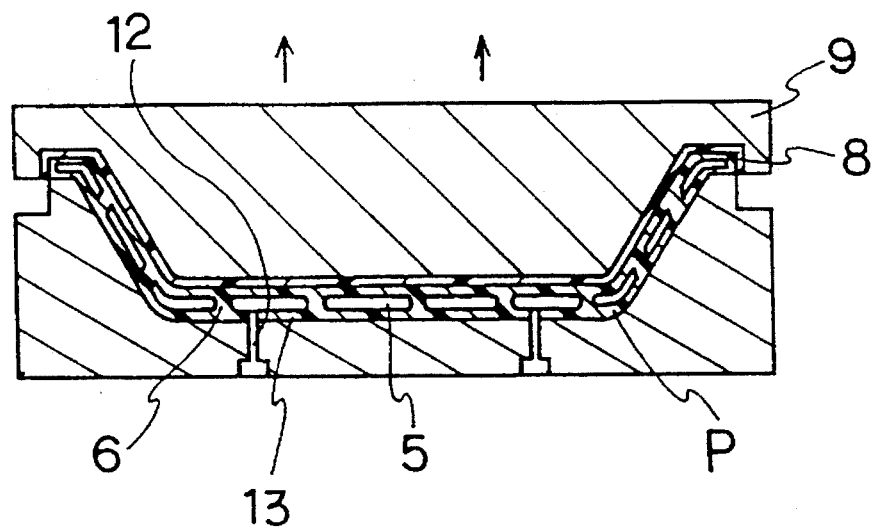

As shown in FIG. 2e which is enlarged in scale for better understanding, the male die 9 is opened to such an extent that the prospective molding is made to have a predetermined thickness, while compressed air is injected into the resin P through the air nozzle 12, thereby enlarging the volume of the resin P by forming the hollow 5 within the resin P.

Further, as shown in FIG. 2e, the upper and lower walls of the hollow 5 are connected by resin P at a plurality of locations by virtue of the viscosity of the resin P to form ribs 6 if the male die 9 is opened with the adequate timing and speed appropriately adjusted depending on the kind of the resin P and the thickness of the prospective molding. Thereafter, the resin P is cooled to set with its internal pressure due to the compressed air being maintained. The mold 11 is then opened and the resulting molded bathtub 1 is removed therefrom. In this way, the compressed air presses the resin P against the entire inner surface (including the back side surface of the inner surface layer component 8) of the cavity 13. Hence, the product reflects the shape of the cavity faithfully and includes the reinforcing layer 4 completely fusion-bonded to the inner surface layer component 8.

Figure 3A:
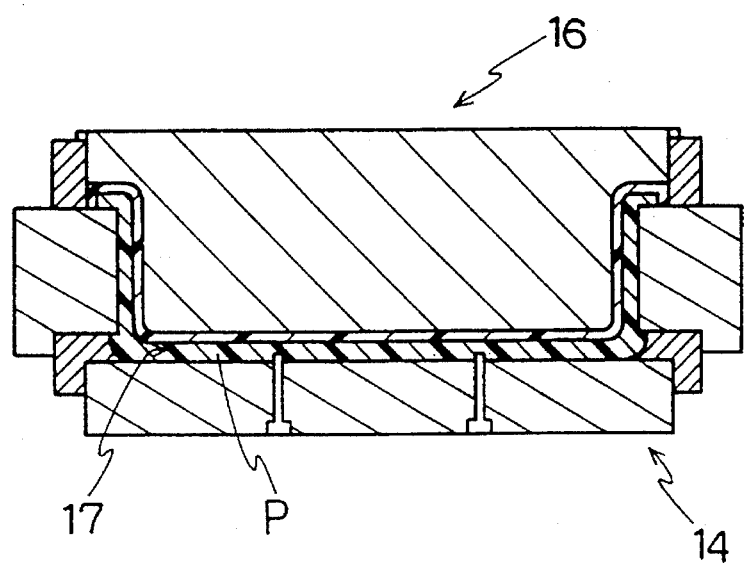
FIGS. 3a and 3b are explanatory views for illustrating another embodiment of the method of the present invention.
Figure 3B:
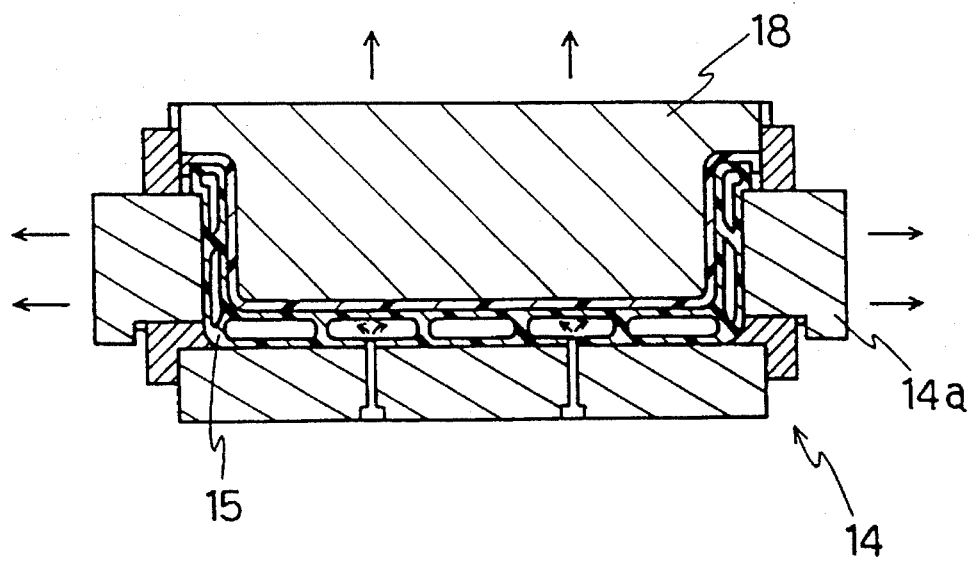

FIG. 3 illustrates a process of molding a bathtub 15 having side walls substantially perpendicular to the bottom thereof with the use of a separable female die 14. Although this process proceeds in the same way as in the previous embodiment till a mold 16 is closed to compressively extend the resin P within a cavity 17 (FIG. 2a through FIG. 2d), the process includes moving lateral portions 14a of the female die 14 in such a direction as to enlarge the volume of the cavity 17 (laterally outwardly) when the male die 18 is opened while compressed air is injected, whereby the reinforcing layer on the back side of the side walls of the bathtub is made hollow.

Similarly, FIG. 4 illustrates a process of molding a bathtub 19. This process is capable of forming ribs 21 within a hollow 20 of the reinforcing layer at predetermined locations assuredly, unlike the previous embodiments (FIGS. 2a to 2e and FIGS. 3a and 3b) which are incapable of predetermining the locations of the rib formation.

Figure 4A:
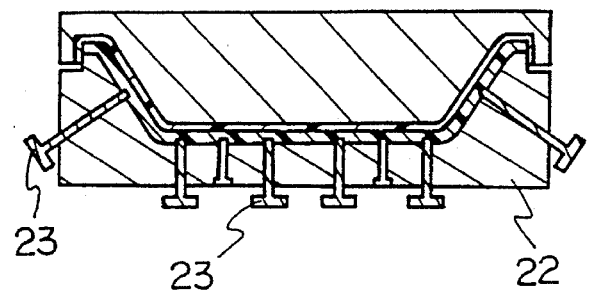
FIGS. 4a, 4b and 4c are explanatory views for illustrating yet another embodiment of the method of the present invention.
Figure 4B:
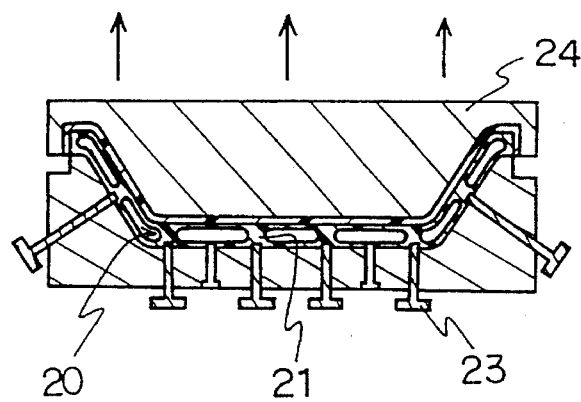
Figure 4C:
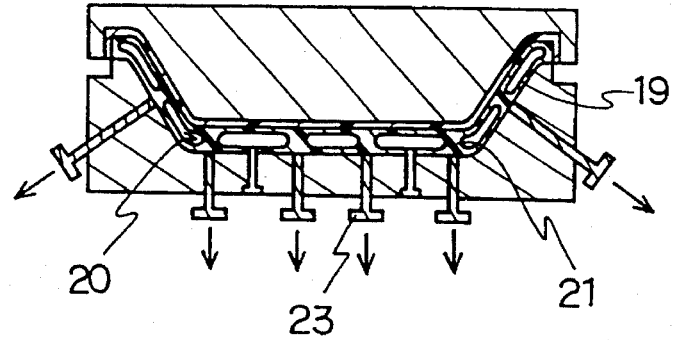

In this process a female die 22 is provided with movable cores 23 which are movable relative to the female die 22 and are adapted to slightly project into the resin P, as shown in FIG. 4a. When a male die 24 is opened while compressed air is injected into the resin P, the portion of the resin P which adheres to the periphery of each core 23 is extended, as shown in FIG. 4b. Thereafter, lowering of cores 23 allows ribs 21 to be formed within a hollow 20 at predetermined locations, as shown in FIG. 4c.

Although not shown, the female die 22 might be lowered with the male die 24 kept stationary while compressed air is injected into the resin P, instead of raising the male die 22. In this case, each movable core 23 is left in a position at the time of mold closing and, after lapse of predetermined time period, is lowered to form a ribs similar to the above.

Thus, in the present invention either of the male and female dies might be moved to enlarge the volume of the cavity in order to define a hollow within the reinforcing layer.

Examples of the synthetic resin material to be used for the reinforcing material include thermoplastic resins such as polystyrene, polyethylene, acrylonitrile-butadiene-styrene resin, acrylonitrile styrene resin, ethylene-vinyl acetate copolymer and polypropylene. Among these, acrylonitrile-butadiene-styrene resin is particularly preferable because of its excellent adhesion with PMMA resin used for the inner surface layer component.

The method of the present invention is capable of molding other types of containers such as kitchen or wash sinks or wash basins, as well as the aforementioned bathtubs. The containers manufactured according to the present method are excellent in rigidity and heat insulating effect.

As has been described, according to the present invention various types of containers can be manufactured relatively easily which are light, tough, highly heat insulative and with a smooth surface agreeable to touch.

While only certain presently preferred embodiments have been described in detail, as will be apparent with those familiar with the art, certain changes and modifications can be made without departing from the spirit and scope of the invention as defined in the following claims.

What is claimed is:

1. A method for manufacturing a bathtub, comprising the steps of:

(a) pre-forming an inner surface layer component comprising a polymethyl methacrylate resin sheet by thermoforming onto a mold using a vacuum forming method;

(b) fitting the inner surface layer component onto a male die;

(c) forming a reinforcing layer by inserting a molten synthetic thermoplastic resin into the inside of a female die wherein the female die further comprises at least one independently movable portion;

(d) fitting the male die onto the female die and bringing the male die and the female die close together to compress the reinforcing layer within a cavity defined between a back surface of the inner surface layer component fitted on the male die and the female die;

(e) injecting compressed air into the reinforcing layer through at least one air nozzle formed in the female die while enlarging the cavity between the male and female dies so as to correspond to a predetermined thickness of the synthetic resin container thereby forming hollow portions within the reinforcing layer and after a lapse of a predetermined time period, moving the independently movable portion in a direction so as to enlarge said cavity between the male and female dies to form a reinforcing rib within said hollow portions;

(f) causing the compressed air to press the reinforcing layer against the entire back surface of the inner surface layer component and the female die; and (g) cooling the synthetic resin of the reinforcing layer to solidify the same and releasing the bathtub from the dies.

* * * * *